United States Patent
Ishihara et al.

(10) Patent No.: US 6,790,248 B2
(45) Date of Patent: Sep. 14, 2004

(54) EXHAUST GAS PURIFICATION FILTER

(75) Inventors: Mikio Ishihara, Kariya (JP); Mamoru Nishimura, Nagoya (JP); Hirohumi Yamashita, Tokoname (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/022,414

(22) Filed: Dec. 20, 2001

(65) Prior Publication Data

US 2002/0078667 A1 Jun. 27, 2002

(30) Foreign Application Priority Data

Dec. 25, 2000 (JP) ........................................ 2000-393021
Oct. 24, 2001 (JP) ........................................ 2001-326481

(51) Int. Cl.[7] .............................................. B01D 46/00
(52) U.S. Cl. ..................... 55/309; 55/DIG. 30; 428/116
(58) Field of Search ............................ 55/282.3, 309, 55/428, 428.1, 523, DIG. 30; 428/116; 422/180

(56) References Cited

U.S. PATENT DOCUMENTS

| | | | | |
|---|---|---|---|---|
| 3,499,269 A | * | 3/1970 | Bois ............................ | 55/309 |
| 4,276,071 A | | 6/1981 | Outland | |
| 4,404,007 A | * | 9/1983 | Tukao et al. .................. | 55/523 |
| 4,464,185 A | * | 8/1984 | Tomita et al. ................ | 55/310 |
| 4,509,966 A | * | 4/1985 | Dimick et al. ................ | 55/502 |
| 4,559,193 A | * | 12/1985 | Ogawa et al. .............. | 264/631 |
| 5,240,485 A | * | 8/1993 | Haerle et al. ................. | 55/309 |
| 5,396,764 A | | 3/1995 | Rao et al. | |
| 5,458,673 A | * | 10/1995 | Kojima et al. ................. | 95/11 |
| 2002/0108360 A1 | * | 8/2002 | Ishihara et al. ............... | 55/523 |

FOREIGN PATENT DOCUMENTS

| | | |
|---|---|---|
| GB | 1213206 | 11/1970 |
| JP | U-58-72414 | 5/1983 |
| JP | A-1-138182 | 5/1989 |
| JP | A-9-262415 | 10/1997 |
| JP | B-2731562 | 3/1998 |
| WO | WO 00/50745 | 8/2000 |

* cited by examiner

*Primary Examiner*—Frank M. Lawrence
(74) *Attorney, Agent, or Firm*—Nixon & Vanderhye PC

(57) ABSTRACT

An exhaust gas filter is capable of suppressing the generation of an excessive pressure loss due to the particulates deposited. At least a part of a multiplicity of cells surrounded by partitioning walls of the honeycombed exhaust gas purification filter have plugs on one of their two end portions. At least a part of the cells to be arranged on the downstream side in the fluid path are partial plugs having openings allowing the fluid flow. The pressure loss caused when the fluid entering the cells passes through the partitioning walls is smaller than the pressure loss caused when the exhaust gas passes through the partial plugs.

10 Claims, 6 Drawing Sheets

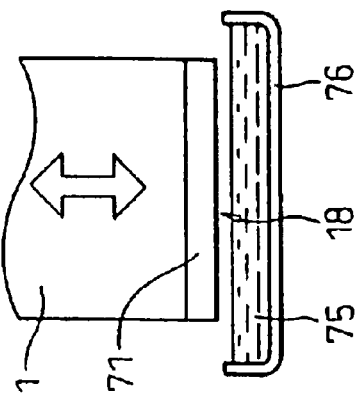
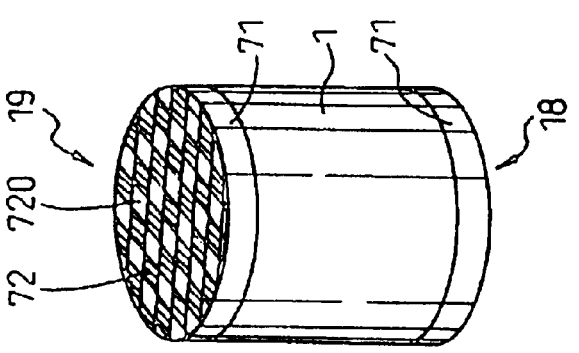
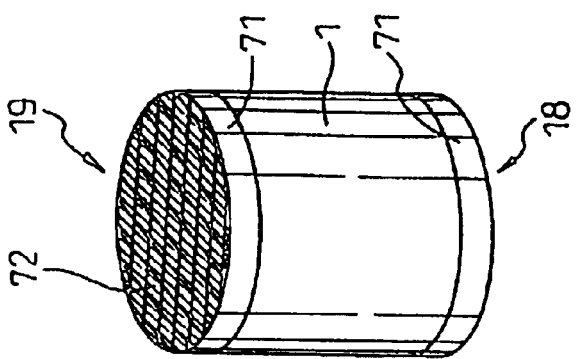
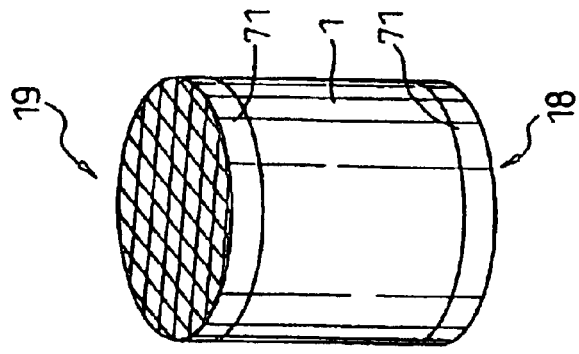

EXHAUST GAS PURIFICATION FILTER

BACKGROUND OF THE INVENTION

1. Field of the Invention

The present invention relates to an exhaust gas purification filter.

2. Description of the Related Art

As a means for purifying the carbon particulates, or the like, emitted from an internal combustion engine for an automobile, etc., a method has been employed in which the particulates are trapped temporarily by a filter and subsequently burned off by heating or using a catalyst.

The filter coated with a catalyst is so configured that a honeycombed structure having a multiplicity of cells makes up an exhaust gas purification filter of which the partitioning walls are coated with the catalyst. The conventional exhaust gas purification filter, as shown in FIGS. 10 and 11, uses a honeycombed structure having cells 90 having alternate ends thereof closed by plugs 95. Specifically, as shown in FIG. 11, the cell end portions in the upstream end surface 91 are alternately closed by the plugs 95 in a checkerwork form, for example. On the downstream end surface 92, on the other hand, the end portions of the cells 90 having the upstream end portions thereof not closed by the plugs 95 are closed with the plugs 95, while the end portions of the cells 90 having the upstream end portions thereof closed with the plugs 95 are left open. Under this condition, the catalyst is carried on the partitioning walls 98.

The use of this exhaust gas purification filter 9 described above makes it possible to trap the particulates on the partitioning walls when the exhaust gas of the internal combustion engine is passed therethrough, which particulates are burnt off, by a catalyst, with the heat of a high-temperature exhaust gas.

The conventional exhaust gas purification filter 9 described above, however, poses the problems described below.

The particulates 88 flowing in the exhaust gas 8 and trapped on the exhaust gas purification filter 9 are not always burnt off at an appropriate time but may be steadily deposited on the partitioning walls 98, as shown in FIG. 12. As long as an exhaust gas 8 low in temperature is being emitted from the internal combustion engine, for example, the burning is not started even by the catalytic action but the particulates 88 only continue to be deposited. In such a case, the pressure loss caused when the exhaust gas 8 passes through a filter, i.e. an exhaust gas purification filter 9 is increased while, at the same time, posing the problem that the filter is eventually heated abnormally and cracked or melted by the combustion heat.

SUMMARY OF THE INVENTION

The present invention has been developed in view of the problem points of the prior art described above, and the object thereof is to provide an exhaust gas purification filter capable of suppressing the generation of excessive pressure loss and preventing the melting due to the deposited particulates.

According to a first aspect of the invention, there is provided an exhaust gas purification filter, for trapping the particulates in the exhaust gas, wherein the pressure loss caused when the exhaust gas passes through the exhaust gas purification filter increases until the amount of the particulates deposited in the exhaust gas purification filter reaches a predetermined value, while the pressure loss is not substantially increased after the amount of the particulates deposited exceeds a predetermined value.

In the exhaust gas purification filter according to this invention, as described above, even in the case where the amount of the particulates deposited increases to such an extent that the pressure loss due to the exhaust gas passing through the filter is increased, the pressure loss is not substantially increased after the amount of the particulates deposited reaches a predetermined value. As a result, an excessive pressure loss can be prevented even in the case where the process for burning off the particulates deposited is carried out belatedly and the amount of the particulates deposited exceeds the predetermined value described above. In this way, the adverse effect that the increased pressure loss otherwise might have on the internal combustion engine, etc. can be suppressed.

The exhaust gas purification filter according to this invention may be formed of a honeycombed structure of a metal instead of ceramic.

According to a second aspect of the invention, there is provided an exhaust gas purification filter wherein the predetermined amount of the particulates deposited is preferably smaller than the amount which makes the partitioning wall melt due to the heat generated when burning the deposited particulates. Then, in the case where particulates exceeding a predetermined value are deposited, the trouble of the exhaust gas purification filter being melted can be reduced.

According to a third aspect of the invention, there is provided an exhaust gas purification filter of a honeycombed structure, having a multiplicity of cells surrounded by partitioning walls, wherein at least some of the cells each have a plug at one of the end portions thereof, wherein at least some of the plugs to be arranged on the downstream side in the fluid path are partial plugs having an opening allowing the fluid to pass therethrough, and wherein the pressure loss caused when the fluid entering the cells passes through the partitioning walls is smaller than the pressure loss caused when the fluid passes through the partial plugs.

Now, the operation of this invention will be explained.

The exhaust gas purification filter according to this invention comprises partial plugs each having an opening on the downstream side of the cells. These partial plugs are related to the pressure loss as described above. In other words, the partial plugs are configured to have a larger passage resistance than the partitioning walls against the fluid.

For this reason, the exhaust gas constituting a fluid entering the cells, is not substantially passed through the openings, if any, of the partial plugs but is passed through the partitioning walls and discharged from the adjacent cells having no plugs.

As a result, the particulates in the exhaust gas are trapped by the partitioning walls and appropriately burnt off by the heat of the heater or by the action of the catalyst carried on the partitioning walls of the exhaust gas purification filter.

In the case where the particulates are not readily burnt by the heat of the heater or by the catalytic action, on the other hand, the particulates come to be deposited steadily on the partitioning walls. In such a case, the pressure loss caused when the fluid passes through the partitioning walls increases to a level larger than the pressure loss caused in the partial plugs.

Under this abnormal condition, with the particulates deposited excessively, the fluid that has entered the cells can be discharged from the openings of the partial plugs, and thus the excessive pressure increase under the abnormal condition can be avoided. After the particulates are burnt off by the catalytic action subsequently, therefore, the filter is regenerated into the initial state so that the fluid again begins to flow through the partitioning walls to restart the trapping of the particulates.

With the exhaust gas purification filter according to this aspect of the invention, therefore, an excessive pressure loss caused by the deposited particulates can be suppressed while at the same time making it possible to prevent cracking and fusion loss.

According to a fourth aspect of the invention, there is provided an exhaust gas purification filter of a honeycombed structure, wherein each of the end surfaces of the exhaust gas purification filter preferably includes the cells ends having a plug and the cell ends having no plug alternately arranged. This arrangement can readily establish a route along which the exhaust gas passes through the partitioning walls.

According to a fifth aspect of the invention, there is provided an exhaust gas purification filter of a honeycombed structure, wherein all the plugs located on the upstream side of the honeycombed structure are preferably complete plugs capable of blocking the passage of the fluid entirely. In the case where the partial plugs are formed on the upstream side surface of the honeycombed structure, the fluid enters directly from the openings of the partial plugs, and the efficiency of trapping the particulates may be deteriorated. By making all the upstream plugs complete, the reduction in the trapping efficiency can be suppressed.

According to a sixth aspect of the invention, there is provided an exhaust gas purification filter of a honeycombed structure, wherein the opening rate of the partial plugs in terms of ((A–B)/A)×100 is preferably in the range of 5 to 80%, where B is the area of the opening of each partial plug and A is the area of the cell opening. In the case where the plug opening rate is less than 5%, the pressure loss caused when the fluid passes through the partial plugs is not increased greatly, while the amount of the fluid directly passing through the filter is increased, thereby probably reducing the efficiency of trapping the particulates. In the case where the plug opening rate is more than 80%, on the other hand, the modification of the complete plugs into the partial plugs may not exhibit a sufficient effect.

According to a seventh aspect of the invention, there is provided an exhaust gas purification filter of a honeycombed structure, wherein the plugs located at the central portion of the downstream end surface of the exhaust gas purification filter are partial plugs, and the plugs located around the partial plugs are complete plugs for completely blocking the passage of the fluid. The flow velocity of the exhaust gas constituting the fluid is higher at the portion nearer to the central portion, so that the pressure increase at the central portion is larger than at the portions surrounding the central portion. As a result, the above-mentioned effects of the partial plugs can be sufficiently exhibited even in the case where only the central portion of the exhaust gas purification filter has the function of avoiding the excessive pressure increase.

According to an eighth aspect of the invention, there is provided an exhaust gas purification filter of a honeycombed structure, wherein all the plugs located on the downstream end surface of the exhaust gas filter are the partial plugs. In this case, the excessive pressure increase can be sufficiently avoided regardless of the fluid flow rate distribution.

According to a ninth aspect of the invention, there is provided an exhaust gas purification filter of a honeycombed structure, wherein the partial plugs preferably represent at least 30% of all the plugs located on the downstream end surface of the exhaust gas purification filter. In the case where the partial plugs represent less than 30%, the effect of preventing the excessive pressure increase described above may be reduced.

According to a tenth aspect of the invention, there is provided an exhaust gas purification filter of a honeycombed structure, wherein that area of the downstream end surface of the exhaust gas purification filter which is located within the curved line connecting the middle points of the lines connecting the center and the outer periphery of the downstream end surface is defined as a central area, and the area located outside the particular curved line is defined as a outer peripheral area. Then, the partial plugs preferably represent a higher percentage of all the plugs in the central area than in the outer peripheral area. As a result, the effect of avoiding the excessive pressure increase can be exhibited more in the central area than in the outer peripheral area.

BRIEF DESCRIPTION OF THE DRAWINGS

FIGS. 4(a) to 4(d) are diagrams for explaining the steps of arranging the plugs according to the first embodiment of the invention.

DESCRIPTION OF THE PREFERRED EMBODIMENTS

First Embodiment

Figure 1:
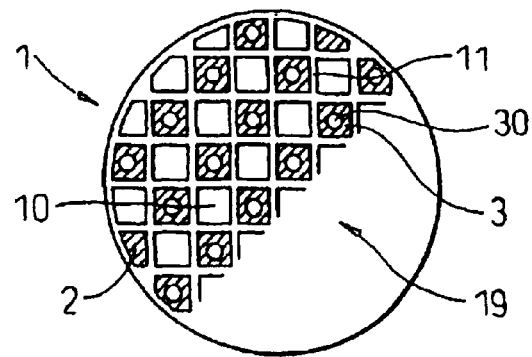
FIG. 1 is a diagram for explaining the downstream end surface of an exhaust gas purification filter according to a first embodiment of the invention.

An exhaust gas purification filter according to a first embodiment of the invention will be explained with reference to FIGS. 1, 2, 3 and FIGS. 4(a) to 4(d).

The exhaust gas purification filter 1 according to this embodiment has a honeycombed structure with a multiplicity of cells 10 each surrounded by partitioning walls 11.

Plugs 2, 3 are formed on one of the end portions of each cell 10. On each of the end surfaces 18, 19 of the exhaust gas purification filter 1, the cell end portions having the plugs 2, 3 and having no plugs are alternately arranged.

Also, at least some of the plugs to be arranged downstream in the fluid path are partial plugs 3 each having an opening 30 through which the fluid can flow.

Further, the honeycombed structure is so configured that the pressure loss caused when the fluid that has entered the cells 10 passes through the partitioning walls 11 is smaller than the pressure loss caused by the fluid passing through the partial plugs.

This will be explained in detail below.

Figure 2:
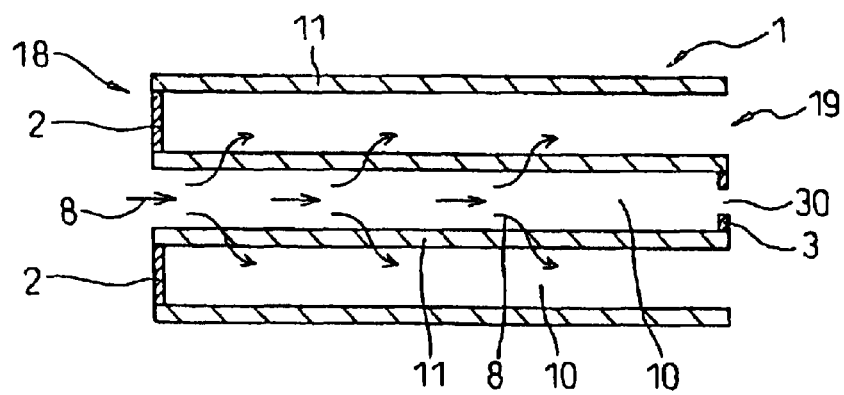
FIG. 2 is a longitudinal sectional view of an exhaust gas purification filter according to the first embodiment of the invention.

The exhaust gas purification filter 1 according to this embodiment, as shown in FIGS. 1 and 2, includes a cylindrical honeycombed structure comprised of cells 10 each having an internal space with a rectangular section. The dimensions of the whole honeycombed structure include a diameter of 140 mmφ and a length of 130 mm. The cell size is 12 mil (300 meshes).

As shown in FIGS. 1 and 2, the cell end portion located on the downstream end surface 19 of the exhaust gas purification filter has cells with plugs 2, 3 and cells with no plug arranged in a checkerwork form.

According to this embodiment, most of the plugs located on the downstream end surface 19 are partial plugs 3 each having an opening 30, and the plugs, though small in percentage, arranged on the outer peripheral end portion are full-fledged plugs 2 having no opening.

Each of the partial plugs 3, as shown in FIG. 1, has the substantially circular opening 30 almost at the central portion thereof.

The partial plugs 3 have a plug opening rate of 5 to 80% in terms of $((A-B)/A) \times 100$, where A is the opening area of the cell 10 and B is the area of the opening 30. Most of the partial plugs have a plug opening rate of about 70%.

As shown in FIG. 2, those end portions of the cells 10 of which the other end portions have no plugs 2, 3 on the downstream end surface 19 thereof, i.e. the cell end portions located on the upstream end surface 18 of the exhaust gas purification filter 1 are formed with complete plugs 2. Thus, the plugs 2 are arranged in a checkerwork form also on the upstream end surface 18.

Also, the partitioning walls 11 are formed with a multiplicity of pores to allow the exhaust gas to pass therethrough.

According to this embodiment, the pressure loss caused by the exhaust gas entering the cells 10 and passing through the partitioning walls is smaller than the pressure loss caused by the exhaust gas passing through the openings 30 of the cells 10.

In fabricating the exhaust gas purification filter 1, the first step is to weigh a ceramic material and, after mixing and agitating it, to extrusion mold the ceramic material into a honeycombed structure using a molding machine. The honeycombed mold thus produced is dried and sintered at about 1400° C. As a result, an exhaust gas purification filter 1 free of plugs is obtained.

The ceramic material described above contains a main material composed of 19% by weight of $SiO_2$, 36% by weight of $MgO.SiO_2$ and 45% by weight of $Al_2O_3$. The ceramic material additionally contains 21.6% by weight of a pore forming agent, 13.5% by weight of a binder and 34% by weight of water, respectively, in terms of percentage per 100% of the main material.

As the next step, the plugs 2, 3 are arranged on the plugless end portions of the cells 10 of the exhaust gas purification filter 1.

In this embodiment, both the full-fledged plugs 2 and the partial plugs 3 are formed by the dipping method as described below.

First, two types of slurry are prepared for dipping.

A first slurry is for dipping the upstream end surface 18 of the exhaust gas purification filter 1, and is comparatively high in concentration. Specifically, the ceramic material described above makes up a main component of this slurry, which additionally contains 80% water in terms of percentage per 100% of the above-mentioned ceramic material.

A second slurry contains the above-mentioned ceramic material as a main component which additionally contains 150% water in terms of percentage per 100% of the above-mentioned ceramic material.

Then, as shown in FIG. 4(a), a protective tape 71 is applied to the outer peripheral surface of the two end portions of the exhaust gas purification filter 1 free of plugs.

As shown in FIG. 4(b), a resin film 72 is attached to the upstream end surface 18 and the downstream end surface 19. The resin film 72 is a vinyl tape 0.1 mm thick.

As the next step, as shown in FIG. 4(c), the portions of the resin film 72 corresponding to the positions where the plugs 2, 3 are to be formed are formed with through holes 720 by bringing a heated jig such a soldering iron into contact therewith. This process is carried out for both the upstream end surface 18 and the downstream end surface 19.

As shown in FIG. 4(d), a vessel 76 containing the first slurry 75 is prepared, and the upstream end portion 18 of the exhaust gas purification filter 1 is dipped in it. In this way, an appropriate amount of the first slurry 75 is allowed to enter by way of the through holes 720 of the resin film 72.

Then, a vessel containing the second slurry is prepared, and in the same manner as shown in FIG. 4(d), the downstream end portion 19 of the exhaust gas purification filter is dipped in it. An appropriate amount of the second slurry is allowed to enter by way of the through holes 720 of the resin film 72.

The exhaust gas purification filter 1 is sintered at about 1400° C., thereby burning off the resin film 72 while at the same time drying the two types of the slurry.

The first slurry on the upstream end surface 18, which has a low water concentration and sufficiently attaches to the cell end portions, makes full-fledged plugs 2 having no opening after baking.

The second slurry on the downstream end surface 19, on the other hand, which has a high water concentration and is not easily attached to the cell end portions, makes partial plugs 3 with openings 30 left after baking. According to this embodiment, some of the cells in the shape of an incomplete rectangle located on the outer peripheral end portion of the downstream end surface 19 have a small opening area and have complete plugs 2.

Now, the functions and effects of the exhaust gas purification filter 1 described above will be explained.

The exhaust gas purification filter 1 includes the partial plugs 3 having the openings 30 on the downstream side thereof. The partial plugs 3 are related to the pressure loss as described below. Specifically, the partial plugs 3 are configured to have a larger resistance to passage of the exhaust gas 8 than the partitioning walls 11. As shown in FIG. 2, therefore, the exhaust gas 8 entering the cells 10 under normal conditions are not substantially passed through the openings 30 of the partial plugs 3 but through the partitioning walls 11, and discharged after moving to the adjacent cells 10 having no plug.

As a result, the particulates in the exhaust gas are trapped in the partitioning walls 11 and appropriately burnt off by the heat of a heater or by the catalytic action.

Figure 3:
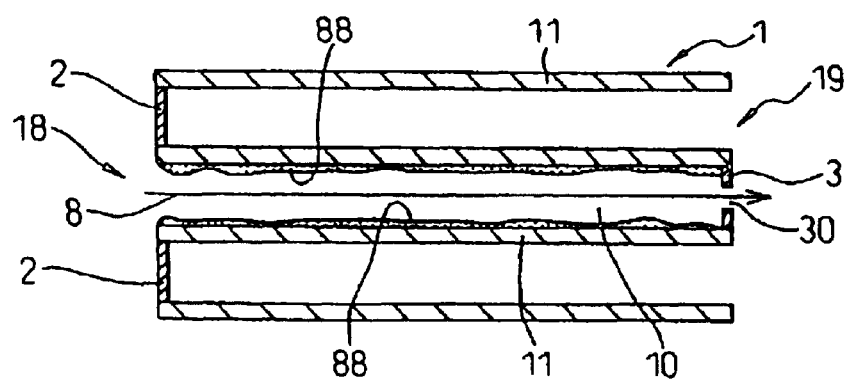
FIG. 3 is a diagram for explaining the exhaust gas flow with the particulates deposited on the partitioning walls according to the first embodiment of the invention.

In the case where the combustion by the heat of the heater or the catalytic action cannot be easily effected as shown in FIG. 3, on the other hand, the particulates 88 are deposited steadily on the partitioning walls. In such a case, the pressure loss caused when the exhaust gas 8 passes through the partitioning walls 11 is increased to a level larger than the pressure loss caused when passing through the partial plugs 3.

Under this abnormal condition where the particulates are deposited to an excessive degree, as shown in FIG. 3, the exhaust gas 8 that has entered the cells 10 is discharged from the openings 30 of the partial plugs 3. As a result, an excessive pressure increase under the abnormal condition can be avoided. Subsequently, when the particulates 88 are burnt off by the heat of a heater or by the catalytic action, the initial state is regenerated and the trapping by the partitioning walls 11 is restarted.

Second Embodiment

This embodiment represent a case in which the shape of the openings 30 of the partial plugs 3, according to the first embodiment, is changed.

Figure 5A:
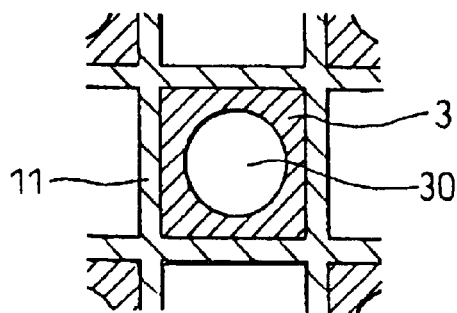
FIGS. 5(a) to 5(f) are diagrams for explaining the shapes of the opening of the partial plug according to modifications of a second embodiment.
Figure 5B:
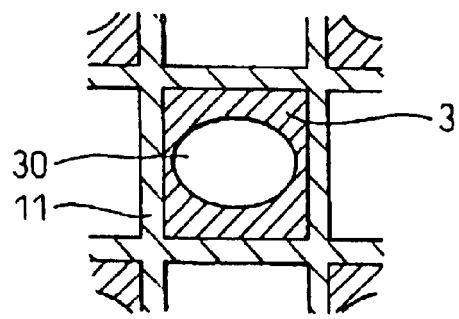
Figure 5C:
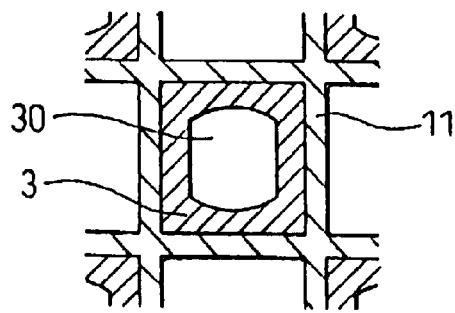
Figure 5D:
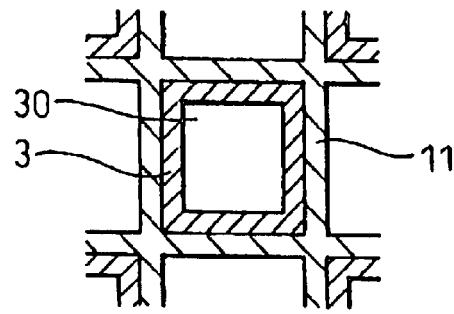

Specifically, in addition to the partial plug 3 having a circular opening 30 as shown in FIG. 5(a) as in the first embodiment, the partial plug 3 having an elliptical opening 30 shown in FIG. 5(b), a barrel-shaped opening 30 shown in FIG. 5(c) or a rectangular opening 30 shown in FIG. 5(d) can be employed as required.

Figure 5E:
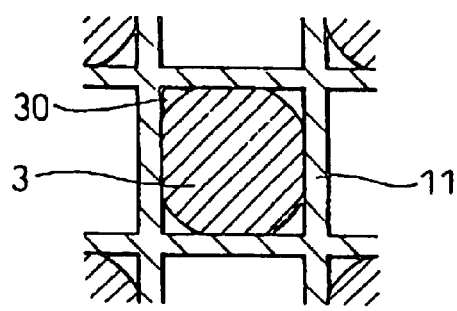
Figure 5F:
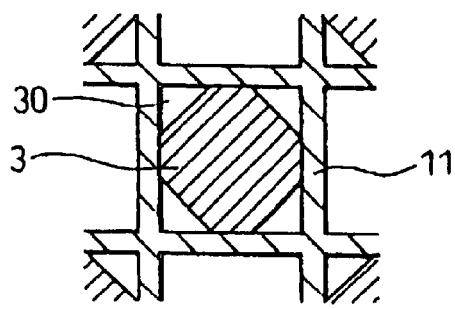

Further, as shown in FIGS. 5(e) and 5(f), the openings 30 may be formed not at the central portion but at the peripheral portions. Which of these shapes is to be selected is dependent mainly on the fabrication method employed.

Regardless of which shape of the opening 30 is employed for the partial plug 3, the functions and effects similar to those of the first embodiment can be attained as long as a similar relation between the partitioning walls 11 and the pressure loss to that in the first embodiment is maintained.

Third Embodiment

This embodiment represents another example of a method of arranging the partial plugs 3 of the exhaust gas purification filter 1 according to the first embodiment.

Figure 6:
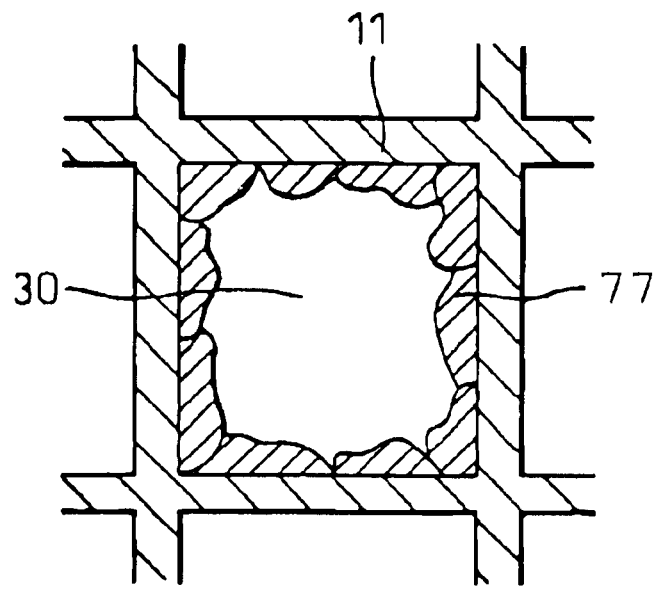
FIG. 6 is a diagram for explaining the steps of arranging the partial plug according to a third embodiment of the invention.

Specifically, in this embodiment, the slurry 77 similar to the first slurry for the first embodiment is prepared. As shown in FIG. 6, the slurry 77 is attached little by little on the inner surface of the cell end portion having the partial plug 3 thereby to reduce the size of the opening area gradually. After baking the structure, a partial plug having an opening can be formed.

Also in this case, the functions and effects similar to those of the first embodiment can be produced.

Other methods that can be employed include a method in which the structure is baked after dipping it in the first slurry as in the first embodiment and then forming a hole with a thin bar-shaped jig before the drying process, or a method in which a hole is drilled out after baking.

Still another method consists in bonding a ceramic plate having openings to the portions corresponding to the openings on the cell end portion.

Fourth Embodiment

Figure 7:
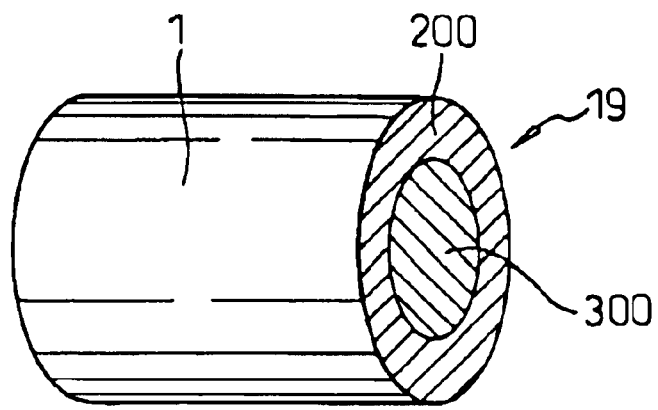
FIG. 7 is a diagram for explaining an example in which an end surface of the exhaust gas purification filter is divided into an area of partial plugs and an area of fully closed plugs.

This embodiment, as shown in FIG. 7, represents a case in which the partial plugs are formed only in the area 300 of the central portion of the downstream end surface 19 of the exhaust gas purification filter 1 while the complete plugs are used for the peripheral area 200. The other points are similar to those of the first embodiment.

Also in this case, the functions and effects similar to those of the first embodiment are achieved.

Fifth Embodiment

This embodiment represents a case in which the exhaust gas purification filter 1 described in the first embodiment is used to measure the relation between the amount of the particulates deposited from the exhaust gas and the pressure loss of the exhaust gas. Specifically, a fluid having similar components to the exhaust gas containing the particulates is supplied through the exhaust gas purification filter 1 to measure the relation between the amount of the particulates deposited and the pressure loss.

Figure 8:
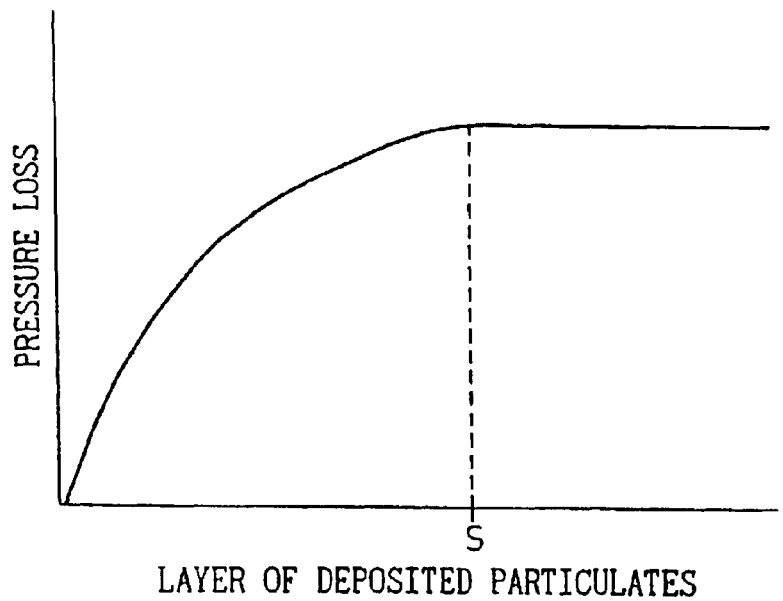
FIG. 8 is a diagram for explaining the relation between the deposited amount of particulates and the pressure loss according to a fifth embodiment of the invention.
Figure 9A:
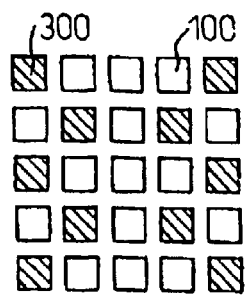
FIGS. 9(a) to 9(f) are diagrams for explaining a plug layout pattern according to modifications of an eighth embodiment of the invention.
Figure 9B:
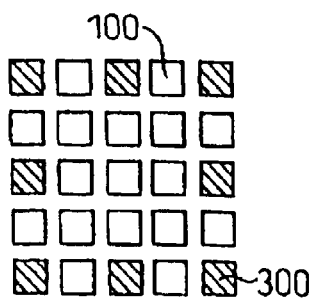
Figure 9C:
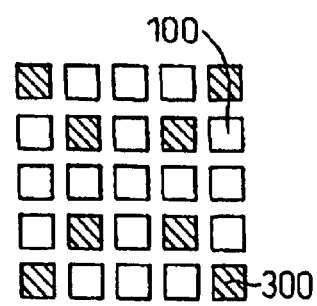
Figure 9D:
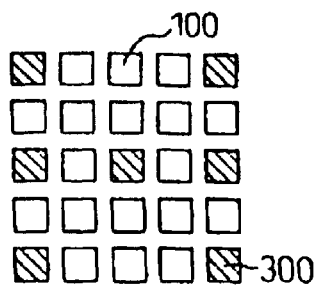
Figure 9E:
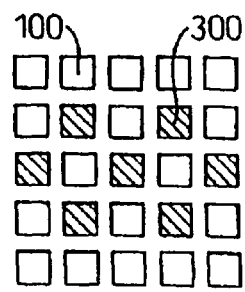
Figure 9F:
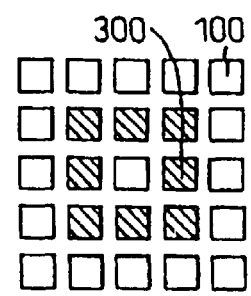
Figure 10:
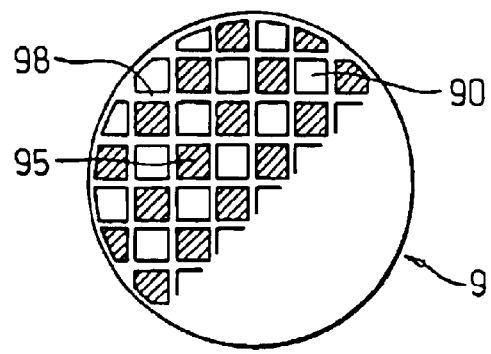
FIG. 10 is a diagram for explaining the downstream end surface of a conventional exhaust gas purification filter.
Figure 11:
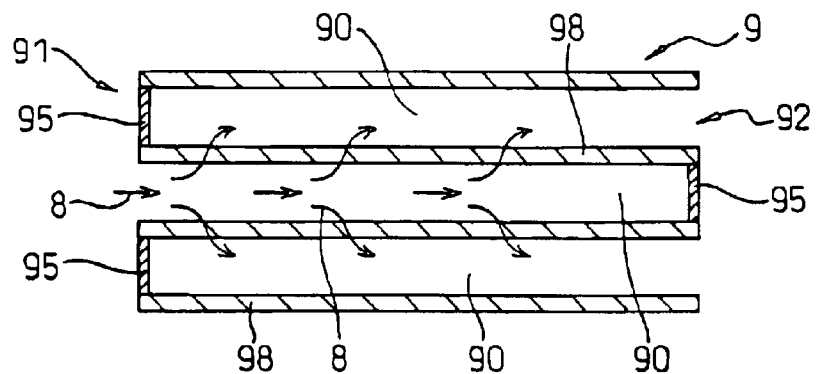
FIG. 11 is a longitudinal sectional view of a conventional exhaust gas purification filter.
Figure 12:
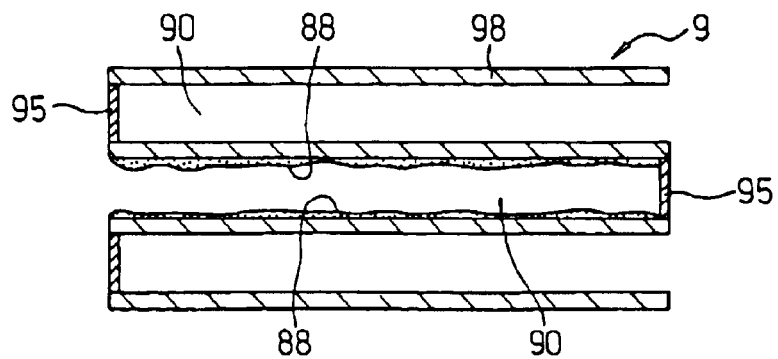
FIG. 12 is a diagram for explaining the problem points posed by the particulates deposited on the partitioning walls according to the prior art.

The result of measurement is shown in FIG. 8. In FIG. 8, the abscissa represents the amount of particulates deposited and the ordinate the pressure loss.

As shown in FIG. 8, the exhaust gas purification filter 1 according to this embodiment has been found to have such a configuration that until the amount of particulates deposited in the exhaust gas purification filter 1 reaches a predetermined value S, the pressure loss caused by the passage of the exhaust gas increases with the deposited amount of the particulates, while after the deposited amount of particulates exceeds the predetermined value S, on the other hand, the pressure loss substantially ceases to increase.

Sixth Embodiment

This embodiment is a modification of the fifth embodiment and represents a case in which the cells in the area 300 of the central portion of the downstream end surface 19 of the exhaust gas purification filter 1 are plugged up, while the cells in the surrounding area 200 are not provided with any plug and have the openings thereof left as they are. The other points are similar to those of the first embodiment.

Also in this case, the functions and effects are similar to those of the first embodiment.

Seventh Embodiment

This embodiment is also a modification of the fifth embodiment, and represents a case in which the cells in the area 300 of the central portion of the downstream end surface 19 of the exhaust gas purification filter 1 are filled up with plugs, while the cells in the surrounding area 200 are filled with partial plugs. The other points are similar to those of the first embodiment.

Also in this case, the functions and effects are similar to those of the first embodiment.

Eighth Embodiment

This embodiment is a modification of the first embodiment and represents a case in which the arrangement of the plugs including the partial plugs which may be replaced with the complete plugs is changed.

As shown in FIGS. 9(a) to 9(f), the open cells 100 and the plugs 300 including the complete plugs or the partial plugs can be variously arranged.

What is claimed is:

1. An exhaust gas purification filter of a honeycombed structure having a multiplicity of cells surrounded by partitioning walls, wherein at least some of the cells each have a plug at one of the end portions thereof, wherein at least some of the plugs to be arranged on the downstream side of the honeycombed structure in the fluid path are partial plugs each having an opening allowing the fluid to pass therethrough, and wherein the pressure loss caused when the fluid entering the cells passes through the partitioning walls is smaller than the pressure loss caused when the fluid passes through the partial plugs;

wherein each of the end surfaces of the exhaust gas purification filter includes an alternate arrangement of the cell end portions each having a plug and the cell end portions each having no plug; and wherein all the plugs located on the upstream side of the honeycombed structure are full-fledged plugs capable of blocking the passage of the fluid entirely.

2. An exhaust gas purification filter according to claim 1, wherein the filling rate of said partial plugs is in the range of 5 to 80% in terms of $((A-B)/A) \times 100$, where B is the area of the opening of each partial plug and A is the area of the cell opening.

3. An exhaust gas purification filter according to claim 1, wherein the plugs located at the central portion of the downstream end surface of the exhaust gas purification filter are partial plugs, and the plugs located around the partial plugs are complete plugs or completely blocking the passage of the fluid.

4. An exhaust gas purification filter according to claim 1, wherein all the plugs located on the downstream end surface of said exhaust gas purification filter are the partial plugs.

5. An exhaust gas purification filter according to claim 1, wherein the partial plugs represent at least 30% of all the plugs located on the downstream end surface of said exhaust gas purification filter.

6. An exhaust gas purification filter according to claim 1 wherein the exhaust gas purification filter is made of ceramic.

7. An exhaust gas purification filter
of a honeycomb structure having a multiplicity of cells surrounded by partitioning walls,
wherein at least some of the cells each having a plug at one of the end portions thereof,
wherein at least some of the plugs to be arranged on the downstream side of the honeycombed structure in the fluid path are partial plugs each having an opening allowing the fluid to pass thererough,
wherein the pressure loss caused when the fluid entering the cells passes through the partitioning walls is smaller than the pressure loss caused when the fluid passes through the partial plugs; and
wherein that area of the downstream end surface of said exhaust gas purification filter which is located within a curved line connecting the middle points of the lines connecting the center and the outer periphery of the downstream end surface is defined as a central area, and the area located outside the particular curved line is defined as a outer peripheral area, and
wherein the partial plugs represent a higher percentage of the plugs in the central area than in the outer peripheral area.

8. An exhaust gas purification filter comprising:
a honeycombed structure having a multiplicity of cells surrounded by partitioning walls thereby defining longitudinal passages from an upstream to a downstream end of said structure;
solid complete plugs being disposed in the upstream end of a first subset of said passages so as to prevent direct gas flow into the upstream ends of said first set of passages; and
plugs also being disposed in the downstream end of the remaining subset of said passages wherein at least a substantial portion of the plugs in said remaining subset of passages are partially open plugs such that the pressure drop experienced by gas flowing through the filter from the upstream end to the downstream end is limited even in the presence of excessive particulate deposits along said passages.

9. An exhaust gas purification filter as in claim 8 wherein said structure is made of ceramic.

10. An exhaust gas purification filter as in claim 8 wherein the partial plugs have an effectively plugged area in the range of 5% to 80% in terms of $((A-B)/A) \times 100$ where B is the area of the opening in the partial plug and A is the cross-sectional area of the passage being partially plugged.

* * * * *